United States Patent
Chen et al.

(10) Patent No.: US 9,207,667 B2
(45) Date of Patent: Dec. 8, 2015

(54) AUTOMATIC GENERATION OF ROBOTIC PROCESSES FOR SYMMETRIC PRODUCTS

(71) Applicant: Siemens Industry Software Ltd., Airport City (IL)

(72) Inventors: Gil Chen, Bnai Zion (IL); Marina Brener, Petah Tikva (IL); Ilanit Shavit, Tel Aviv (IL)

(73) Assignee: Siemens Industry Software Ltd., Airport City (IL)

( * ) Notice: Subject to any disclaimer, the term of this patent is extended or adjusted under 35 U.S.C. 154(b) by 144 days.

(21) Appl. No.: 13/863,516

(22) Filed: Apr. 16, 2013

(65) Prior Publication Data
US 2014/0309774 A1 Oct. 16, 2014

(51) Int. Cl.
*G05B 19/418* (2006.01)
*G06Q 10/06* (2012.01)

(52) U.S. Cl.
CPC ........ *G05B 19/41865* (2013.01); *G06Q 10/063* (2013.01); *G05B 2219/40113* (2013.01)

(58) Field of Classification Search
CPC ............... G05B 19/41865; G05B 2219/40113; G05B 19/4187; G05B 19/4188; G05B 19/41885; G05B 19/418; G05B 19/41815; G05B 19/41825; G05B 19/41845; B25J 9/1682; B25J 9/0087; B25J 9/0084
USPC ......................... 700/247, 248, 262
See application file for complete search history.

(56) References Cited

U.S. PATENT DOCUMENTS

| | | | | | |
|---|---|---|---|---|---|
| 5,191,639 | A | * | 3/1993 | Hara | B25J 9/1682 700/262 |
| 5,412,759 | A | * | 5/1995 | Yano | G05B 19/4083 700/248 |
| 5,889,924 | A | * | 3/1999 | Okabayashi | B25J 9/1682 700/245 |
| 2004/0257021 | A1 | * | 12/2004 | Chang | B25J 9/1669 318/568.21 |

OTHER PUBLICATIONS

"Statement in accordance with the Notice from the European Patent Office dated Oct. 1, 2007 concerning business methods"; pp. 592-593; XP007905525. (2 pages).
PCT Search Report dated Jul. 25, 2014, for application No. PCT/IL2014/050333. (7 pages).

* cited by examiner

*Primary Examiner* — Stephen Holwerda

(57) ABSTRACT

Methods for producing a robot program for a substantially-symmetric product and corresponding systems and computer-readable mediums. A method includes receiving a first-side robot program. The first-side robot program is a robot program for processing a first side of the substantially-symmetric product. The method includes identifying one or more resources of the first-side robot program by and producing corresponding mirrored resources in a second-side robot program. The method includes identifying one or more robots for the first-side robot program and producing corresponding mirrored robots in the second-side robot program. The method includes processing machine data files of the first-side robot program and updating logic block signal connections from the first-side robot program to the second-side robot program. The method includes replacing references to objects in the second-side robot program and assigning tool mounts to the second-side robot program. The method includes producing and storing the second-side robot program.

20 Claims, 3 Drawing Sheets

AUTOMATIC GENERATION OF ROBOTIC PROCESSES FOR SYMMETRIC PRODUCTS

TECHNICAL FIELD

The present disclosure is directed, in general, to computer-aided design, visualization, and manufacturing systems, product data management (PDM) systems, and similar systems, that manage data and processes for products and other items (collectively, product lifecycle management (PLM) systems).

BACKGROUND OF THE DISCLOSURE

Improved PLM systems are desirable.

SUMMARY OF THE DISCLOSURE

Various disclosed embodiments include methods for producing a robot program for a substantially-symmetric product and corresponding systems and computer-readable mediums. A method includes receiving a first-side robot program. The first-side robot program is a robot program for processing a first side of the substantially-symmetric product. The method includes identifying one or more resources of the first-side robot program by and producing corresponding mirrored resources in a second-side robot program. The method includes identifying one or more robots for the first-side robot program and producing corresponding mirrored robots in the second-side robot program. The method includes processing machine data files of the first-side robot program and updating logic block signal connections from the first-side robot program to the second-side robot program. The method includes replacing references to objects in the second-side robot program and assigning tool mounts to the second-side robot program. The method includes producing and storing the second-side robot program, wherein the second-side robot program is a complete adapted robot program for processing a second side of the substantially-symmetric product and corresponds to the first-side robot program.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
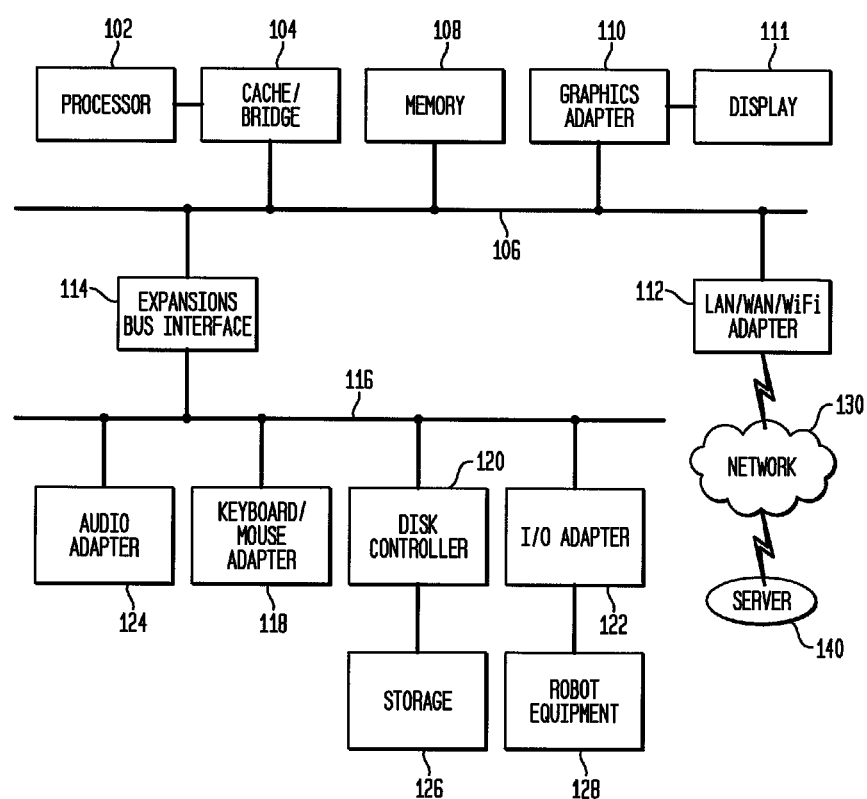
FIG. 1 illustrates a block diagram of a data processing system in which an embodiment can be implemented.
Figure 2A:
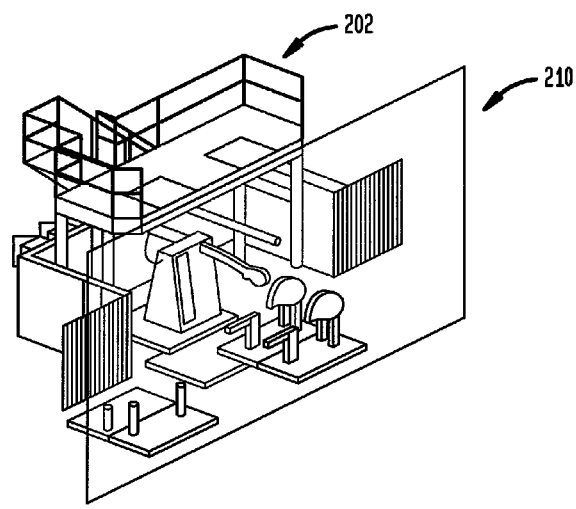
FIG. 2a illustrates a "half-process" robotic station that has been configured to properly perform its processes on the left side of a symmetric product.
Figure 2B:
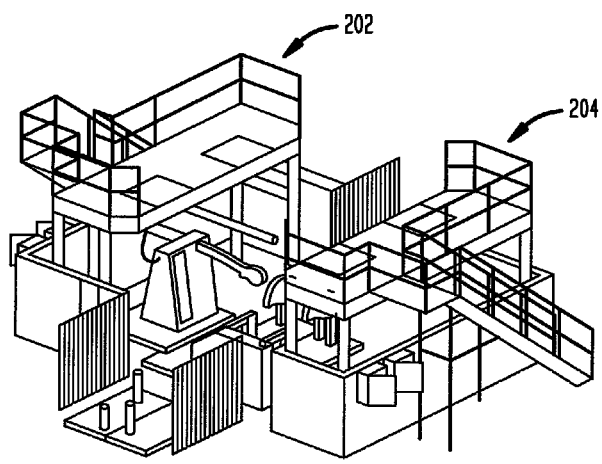
FIG. 2b illustrates a complete adaptive symmetric process with a "full-process" robotic station.
Figure 3:
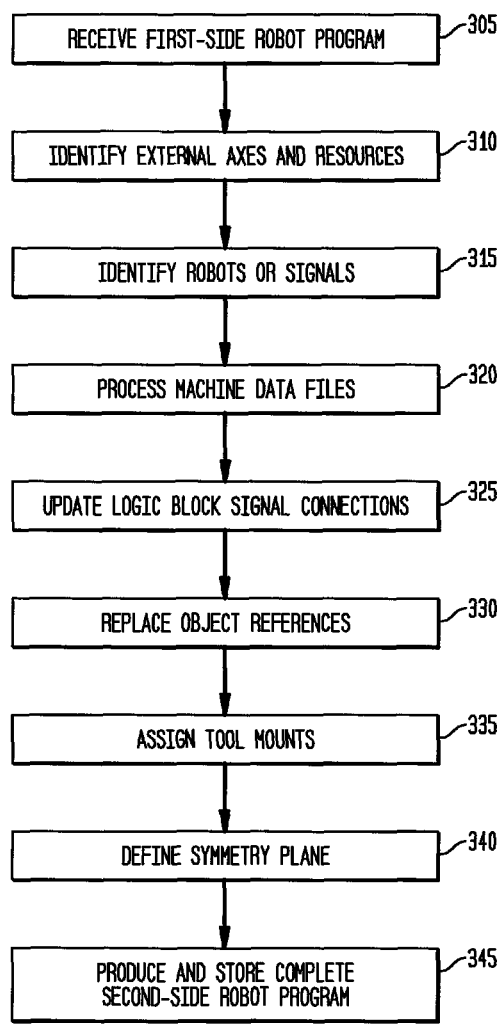
FIG. 3 illustrates a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Unlike CAD applications, where symmetric geometry can be automatically generated, in robotics process planning applications, there are no efficient tools to define symmetric processes. This is in part due to the complexity of a process definition, compared to a geometric model, and so simple CAD geometry techniques do not apply to robotic process planning applications. The geometric aspect of a process is only one of the simpler elements to deal with while planning a symmetric process. Other elements, such as the path, its attributes, external axes, logic of the process and mapping all of the signals that are involved, make the symmetric process definition more challenging and time consuming.

Typically, when defining a symmetric process to be performed by one or more robots, a process planner invests valuable time in defining one side of the process, then, spends almost the same amount of time repeating the same (or nearly the same) definitions to apply to the other side of it. The problem with this method is the huge amount of time that is spent in redefining the process for the other side, which sometimes reaches planning time of several weeks. In some cases, due to the fact that each side of the process is planned manually, there are incorrect differences between both sides that lead to quality issues.

Disclosed embodiments provide efficient means for creating symmetric robotic processes.

It may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments. Other specific terms used herein include:

Location refers to a point in space with orientation. This can be defined as 6 values (coordinates) that represent X, Y, Z as the position of the location and Rx, Ry, Rz as the orientation (angle) relative to X, Y and Z axis.

An industrial robot is officially defined by ISO as an automatically controlled, reprogrammable, multipurpose manipulator programmable in three or more axis (or "joints"). The field of robotics may be more practically defined as the study, design, and use of robot systems for manufacturing (a top-level definition relying on the prior definition of a robot).

A robotic path refers to a list of locations defining the position and orientation of the robot End Of Arm, also known as Tool Center Point Frame (or TCPF).

A manufacturing feature (MFG) refers to any kind of manufacturing technology that is used in the manufacturing process. Common MFG type in the automotive body in white process is spot weld, which is a discrete MFG. A process with spot weld MFGs is defined as contacting metal surfaces that are joined by the heat obtained from resistance to electric current. Work-pieces are held together under pressure exerted by electrodes.

An off-line programming (OLP) command refers to a command to the robot to apply a specific action. The command can be defined to be applied once the robot reaches a specific location along its path. Commands can send or wait for signals, let other devices act and complete tasks, control cooling, motion, pneumatic, and other aspects of the process. The commands are added in the virtual environment off-line, before transferring the program to the robot.

A mounted tool refers to a device that is mounted to a robot and is used as an operating device. For example, a welding gun is a tool that is typically mounted to the $6^{th}$ joint of a robot for spot welding applications. A gripper is a mounted tool for material handling applications.

A robotic signal refers to signals that are sent by or to a robot. This is the basic way to communicate with robots. Robots send and receive signals to communicate with the environment. There may be couple of tens or even hundreds of signals per robot, each having a unique name.

A "resource" refers to any equipment used during the process. Typical resources are robots, grippers, welding and gluing guns, safety equipment, tables, fixtures and clamps, rails, fences, containers, racks, axes, parameters related to any of any equipment, etc.

An RCS module refers to a module provided by the robot vendor to support very accurate robotic simulation that considers mechanical and physical limitations and constraints of the actual robot.

Robot machine data files are files that are used as input to the RCS Module in order to achieve an accurate simulation.

A logic block is a block that defines logic of a process. The block can have inputs, internal parameters and outputs. The inputs and outputs can be connected to signals.

A product symmetry plane refers to symmetry plane of a symmetric product, such as a vehicle body. This is not necessary the same as the symmetry plane of the process as there may be a requirement to generate a complete station or robotic work cell symmetric process, which its symmetry plane is different than the product symmetry plane.

An external axis refers to an axis of a tool mounted to or associated with the robot. In addition to the kinematics of a robot, it is common to have additional devices either mounted to the robot (like a servo gun) or that the robot is mounted to them (like a rail that the robot is mounted to its sliding device).

An external axis value on path locations refers to external axis definitions with respect to the robot path and positioning. To define realistic robotic simulation, the external axis joints' values are defined on path locations, so whenever a robot moves, the motion considers the values of the external axes.

A "robot program," as used herein, can include tool parameters, axes, locations, resource names, other data as described herein, and other information, and is not limited to a list of commands to be sent to the robot. The robot program can include information regarding some or all of the entire plant layout and resources.

Industrial robots are widely used for processes such as spot and arc welding, gluing, sealing, dispensing, material handling and assembly, machining, and other operations. "Processing" a product or portion of a product, as used herein, can include any of these processes. In many cases, when a product is symmetric, the processes performed on either side of the product are similar but not identical. Note that the "product" described herein may be a complete product, a product component, or any other part or object being manufactured and manipulated as described herein.

In more complex scenarios, a complete robotic work cell process has a right side and left side configurations, which are symmetric with adaptations. The development of a robotic program is complex and might take several weeks. There is a challenge to reuse the program developed for one side at the other side with minimal additional work. Building a mechanism to automatically generate a mirrored robotic program with adaptations by leveraging all work invested in the original program significantly reduces overall development time.

Some mirroring tools refer to the geometric aspects of the symmetric 3D objects. This includes the location of resources and parts relative to defined symmetric plane. For example, the robot, welding gun and fixture, and parts. This can also include the position and orientation of robotic path locations.

Disclosed embodiments provide a major improvement to an existing procedure to automatically generate an adaptive robotic process. Various embodiments can consider a wide range of information that the tool reuses and takes into account while generating the adaptive robotic program. Disclosed processes can then produce a "mature" program where only few fine tuning tasks are required before downloading to it to the robot.

FIG. 1 depicts a block diagram of a data processing system in which an embodiment can be implemented, for example, as a PLM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to the I/O adapter 122 is robot equipment 128, which can be implemented as any robotic tool, system, processor, controller, or other machinery known to those of skill in the art, and can be used to implement embodiments described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments include systems and methods from adapting a source process for use with the opposite side of a substantially-symmetric product. Embodiments include an automatic mechanism to apply adaptations on a source process to result a mature 2-side process for such a substantially-symmetric product. For ease of reference, the term "symmetric" will be used to refer to substantially-symmetric products that may have minor or insubstantial differences between two sides.

Disclosed embodiments can interpret and adapt a number of robot-control and other data types in performing processes as disclosed herein. These can include copying external axis values to target locations, automatically renaming robotic signals and resources, updating logic block signal connections, replacing references to objects, automatically mounting a tool(s) to the mirrored robot, defining the product symmetry plane, and others.

FIG. 2a illustrates a "half-process" robotic station 202 that has been configured to properly perform its processes on the left side of a symmetric product. In this example, assume that the product is symmetric about the symmetry plane 210.

FIG. 2b illustrates a complete adaptive symmetric process with a "full-process" robotic station 202/204, including automatically generated processes to perform the corresponding processes on the right side of the symmetric product as were defined for the left side of the symmetric product.

Disclosed embodiments include systems and methods for efficient symmetric robotic process generation. According to various embodiments, such a process can include two high-level processes. First, the system defines the process for a first side of the product. This can include receiving an already-defined process, developing the process via an interaction with a user, or otherwise.

Then, the system can read the defined first-side process and other information, such as user-defined information, and automatically generate the entire process for the mirrored symmetric side. While doing so, the process considers all the important elements to result an accurate symmetric process. This includes, but is not limited to: the external axis values on path locations, robotic signals, resources names, robot machine data information, process logic (logic blocks), signals connections, reference to objects, the produce symmetric plane, and others.

FIG. 3 illustrates a flowchart of a process in accordance with disclosed embodiments that can be performed, for example, by one or more PLM systems as described herein, referred to generically as the "system."

The system receives a first-side robot program (305). "Receiving," as used herein, can include loading from storage, receiving from another device or process, receiving via an interaction with a user, or otherwise. The first-side robot program can include any of the information described herein for a robot program.

The system can identify one or more resources of the first-side robot program (310). As part of this process, the system can find all the assigned resources of the first-side robot program to produce mirrored resources of a second-side robot program. The system can check, for each resource, the existence of external axes definitions. If an external axis is defined, the system can iterate over all the path locations and copy the external axis value from the first-side robot program to the second-side robot program, for example while mapping the external axes device of the first side to the second side. For example, if the first-side robot program has an external axes device named EA1 and there is an operation that refers to it, and a location (loc) in its path has a value for EA1, then, after mirroring, there will be a mirrored operation in the second-side robot program with a mirrored location (loc_mirr) and a new external axis EA2. Loc_mirr inherits the same value of the equivalent loc in the first-side robot program, but will refer to EA2.

The system can identify one or more robots or robot signals for the first-side robot program (315). As part of this process, the system can find all of the assigned robots of the first-side robot program and produce corresponding mirrored robots in the second-side robot program; the "mirrored robots" can include, for example, mirrored layouts, resources, operations, and other data for the "mirrored" second-side robot program that corresponds to a first-side robot program. The system can copy, for each of the assigned robots, some or all of the robot signals to a corresponding mirrored robot of the second-side robot program. The system can rename the robot signals of the first-side robot program for use as robot signals in the second-side robot program; this can be performed according to naming rules defined by the user or otherwise, for example using fixed prefixes/suffixes or by regular expressions. The system can iterate over all the mirrored resources and rename them according to naming rules, such as user-defined naming rules or otherwise.

The system can process machine data files of the first-side robot program (320). This process can include copying machine data information for each first-side robot program robot to the corresponding mirrored robot of the second-side robot program.

The system can update logic block signal connections from the first-side robot program to the second-side robot program (325). As part of this process, the system can iterate over the assigned resources of the first-side robot program. If a resource contains a logic block (which will have been mirrored with the resource to a mirrored logic block), the system can iterate over all the entry and exit signals of the logic block and get the connected robot signal for each entry and exit. The system can identify the resource that the robot signal belongs to in the first-side robot program, find the corresponding mirrored resource in the second-side robot program, and identify a corresponding signal in the second-side robot program according to the naming rules. The system can then connect the corresponding signals in the second-side robot program to the appropriate connections of the corresponding mirrored logic block. The system thereby maps logic block connections in the first-side robot program to corresponding logic block connections in the second-side robot program.

The system can replace references to objects in the second-side robot program (330). As part of this process, the system can iterate over all OLP commands and robotic parameters defined for the mirrored resources, signals, logic blocks, signal connections, machine data files, or other mirrored objects. For each command or parameter that refers to a resource of the first-side robot program, the system can replace the reference with a reference to the mirrored object of that resource, if one was defined.

The system can automatically assign tool mounts to the second-side robot program (335). As part of this process, the system can find all assigned robots that have mounted tool within the mirroring scope. The system can then identify cases that the mirrored robot will be created as a new robot while the mounted gun will use an existing gun that was previously prepared by a user or otherwise pre-defined. For these cases, the system can automatically mount the defined mirrored tool to the newly created mirrored robot according to the mount definitions and tool of the first-side robot program and the same mounting frame information can be re-used in the second-side robot program.

The system can define a product symmetry plane corresponding to the substantially-symmetric product (340). This can be performed by, for example, receiving a user input that selects or defines the product symmetry plane, by using a default product symmetry plane, or otherwise. As part of this step, the system can define the plane axis and the offset from the origin for the product symmetry plane. The system can define all MFGs to be searched in MFG libraries, and it can take the product symmetry plane into account to correctly treat each MFG. For each MFG, the system can calculate the mirrored position according to the plane definition. The system can search in the MFG libraries for MFGs to ensure that their distance from the mirrored position is within a defined tolerance and can return the closest MFG found.

The system produces and stores the complete second-side robot program (345). The second-side robot program can be a complete adapted robot program for processing a second side of a substantially-symmetric product, and corresponds to the first-side robot program. The second-side robot program can be produced according to some or all of the elements described above, which can include the external axis values on path locations, robotic signals, resources names, robot machine data information, process logic (logic blocks), signals connections, reference to objects, the produce symmetric plane, and others.

The system can thereafter process the product, using the first-side robot program to process the first side of the product and using the second-side robot program to process the substantially-symmetric second side robot program.

Of course, those of skill in the art will recognize that, unless specifically indicated or required by the sequence of operations, certain steps in the processes described above may be omitted, performed concurrently or sequentially, or performed in a different order.

The system can receive user inputs and a first-side robot program for a first side of a product and automatically apply adaptations to produce a complete second-side robot program for the other side of the product. User inputs can include the process symmetry plane and object mapping. The adaptations performed by processes described herein can include external axis values on source location, robotic signals, resources names, robot machine data files, process logic definition, a list of objects that are referenced by the process, a list of mounted tool and the mounting parameters, and others.

Disclosed embodiments can consider all aspects of the first-side process when mirroring it. Various embodiments can also process additional information about the logic of the process, connection of signals to hardware, heuristics and elements of artificial intelligence (rules) to predict exceptions and planner's intention, and other aspects.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs), or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for producing a robot program for a substantially-symmetric product, comprising:
   receiving a first-side robot program by a data processing system, wherein the first-side robot program is a robot program for processing a first side of the substantially-symmetric product;
   identifying one or more resources of the first-side robot program by the data processing system and producing corresponding mirrored resources in a second-side robot program;
   identifying one or more robots for the first-side robot program by the data processing system and producing corresponding mirrored robots in the second-side robot program;
   processing machine data files of the first-side robot program by the data processing system;
   updating logic block signal connections from the first-side robot program to the second-side robot program by the data processing system;
   replacing references to objects in the second-side robot program by the data processing system;
   assigning tool mounts to the second-side robot program by the data processing system, according to a mount definition and a tool of the first-side robot program;
   producing and storing the second-side robot program by the data processing system, wherein the second-side robot program is a complete adapted robot program for processing a second side of the substantially-symmetric product and corresponds to the first-side robot program.

2. The method of claim 1, wherein the data processing system also checks, for each resource in the first-side robot program, the existence of external axes definitions, and if an external axis is defined, iterates over a plurality of path locations and copies external axis values from the first-side robot program to the second-side robot program.

3. The method of claim 1, wherein the data processing system also copies a plurality of robot signals from identified robots in the first-side robot program to corresponding mirrored robots of the second-side robot program.

4. The method of claim 1, wherein the data processing system also renames robot signals and resources of the first-side robot program for use as robot signals of the second-side robot program according to naming rules.

5. The method of claim 1, wherein the data processing system also maps logic block connections in the first-side robot program to corresponding logic block connections in the second-side robot program.

6. The method of claim 1, wherein the data processing system replaces references to objects in the second-side robot program by replacing references to resources in the first-side robot program with references to corresponding mirrored resources in the second-side robot program.

7. The method of claim 1, wherein the data processing system also defines a product symmetry plane corresponding to the substantially-symmetric product.

8. A data processing system comprising:
   a processor; and
   an accessible memory, the data processing system particularly configured to receive a first-side robot program, wherein the first-side robot program is a robot program for processing a first side of a substantially-symmetric product;
   identify one or more resources of the first-side robot program and producing corresponding mirrored resources in a second-side robot program;
   identify one or more robots for the first-side robot program and producing corresponding mirrored robots in the second-side robot program;
   process machine data files of the first-side robot program;
   update logic block signal connections from the first-side robot program to the second-side robot program;
   replace references to objects in the second-side robot program;
   assign tool mounts to the second-side robot program according to a mount definition and a tool of the first-side robot program;
   produce and storing the second-side robot program, wherein the second-side robot program is a complete adapted robot program for processing a second side of the substantially-symmetric product and corresponds to the first-side robot program.

9. The data processing system of claim 8, wherein the data processing system also checks, for each resource in the first-side robot program, the existence of external axes definitions, and of an external axis is defined, iterates over a plurality of path locations and copies external axis values from the first-side robot program to the second-side robot program.

10. The data processing system of claim 8, wherein the data processing system also copies a plurality of robot signals from identified robots in the first-side robot program to corresponding mirrored robots of the second-side robot program.

11. The data processing system of claim 8, wherein the data processing system also renames robot signals and resources of the first-side robot program for use as robot signals of the second-side robot program according to naming rules.

12. The data processing system of claim 8, wherein the data processing system also maps logic block connections in the first-side robot program to corresponding logic block connections in the second-side robot program.

13. The data processing system of claim 8, wherein the data processing system replaces references to objects in the second-side robot program by replacing references to resources in the first-side robot program with references to corresponding mirrored resources in the second-side robot program.

14. The data processing system of claim 8, wherein the data processing system also defines a product symmetry plane corresponding to the substantially-symmetric product.

15. A non-transitory computer-readable medium encoded with executable instructions that, when executed, cause one or more data processing systems to:
   receive a first-side robot program, wherein the first-side robot program is a robot program for processing a first side of a substantially-symmetric product;
   identify one or more resources of the first-side robot program and producing corresponding mirrored resources in a second-side robot program;
   identify one or more robots for the first-side robot program and producing corresponding mirrored robots in the second-side robot program;
   process machine data files of the first-side robot program;
   update logic block signal connections from the first-side robot program to the second-side robot program;
   replace references to objects in the second-side robot program;
   assign tool mounts to the second-side robot program according to a mount definition and a tool of the first-side robot program;
   produce and storing the second-side robot program, wherein the second-side robot program is a complete adapted robot program for processing a second side of the substantially-symmetric product and corresponds to the first-side robot program.

16. The computer-readable medium of claim 15, wherein the data processing system also checks, for each resource in the first-side robot program, the existence of external axes definitions, and of an external axis is defined, iterates over a plurality of path locations and copies external axis values from the first-side robot program to the second-side robot program.

17. The computer-readable medium of claim 15, wherein the data processing system also copies a plurality of robot signals from identified robots in the first-side robot program to corresponding mirrored robots of the second-side robot program.

18. The computer-readable medium of claim 15, wherein the data processing system also renames robot signals and resources of the first-side robot program for use as robot signals of the second-side robot program according to naming rules.

19. The computer-readable medium of claim 15, wherein the data processing system also maps logic block connections in the first-side robot program to corresponding logic block connections in the second-side robot program.

20. The computer-readable medium of claim 15, wherein the data processing system replaces references to objects in the second-side robot program by replacing references to resources in the first-side robot program with references to corresponding mirrored resources in the second-side robot program.

* * * * *